US012423140B2

(12) United States Patent
Wang et al.

(10) Patent No.: US 12,423,140 B2
(45) Date of Patent: Sep. 23, 2025

(54) DEEP LEARNING FRAMEWORK SCHEDULING

(71) Applicant: BEIJING BAIDU NETCOM SCIENCE TECHNOLOGY CO., LTD., Beijing (CN)

(72) Inventors: Haifeng Wang, Beijing (CN); Xiaoguang Hu, Beijing (CN); Dianhai Yu, Beijing (CN); Yanjun Ma, Beijing (CN); Tian Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 840 days.

(21) Appl. No.: 17/707,895

(22) Filed: Mar. 29, 2022

(65) Prior Publication Data

US 2022/0222111 A1 Jul. 14, 2022

(30) Foreign Application Priority Data

Apr. 2, 2021 (CN) ......................... 202110362239.3

(51) Int. Cl.
*G06F 9/46* (2006.01)
*G06F 9/48* (2006.01)
*G06F 9/50* (2006.01)

(52) U.S. Cl.
CPC .......... *G06F 9/4887* (2013.01); *G06F 9/5038* (2013.01); *G06F 9/505* (2013.01)

(58) Field of Classification Search
CPC ....... G06F 9/4887; G06F 9/5038; G06F 9/505
See application file for complete search history.

(56) References Cited

U.S. PATENT DOCUMENTS

| 2009/0241117 | A1* | 9/2009 | Dasgupta | G06F 9/5038 718/101 |
| 2013/0191836 | A1 | 7/2013 | Meyer | |
| 2013/0326528 | A1 | 12/2013 | Shankar et al. | |
| 2019/0324805 | A1* | 10/2019 | Peng | G06F 9/5005 |
| 2020/0042362 | A1 | 2/2020 | Cui et al. | |

(Continued)

FOREIGN PATENT DOCUMENTS

| CN | 101056264 A | 10/2007 |
| CN | 105824702 A | 8/2016 |
| CN | 109254846 A | 1/2019 |

(Continued)

*Primary Examiner* — Gregory A Kessler
(74) *Attorney, Agent, or Firm* — Maschoff Brennan; Younghwan Lee; Liang Huang (57) ABSTRACT

A scheduling method for a deep learning framework, a scheduling apparatus, an electronic device, a storage medium, and a program product is provided, and can be used in the field of artificial intelligence, especially in the fields of machine learning, deep learning, etc. The method includes: receiving a processing request for processing a plurality of tasks by using a dedicated processing unit, the processing request including scheduling requirements for the plurality of tasks, and each of the plurality of tasks being associated with execution of multi-batch data processing; and scheduling, based on the scheduling requirements for the plurality of tasks in batches of data, the dedicated processing unit to process the plurality of tasks.

10 Claims, 4 Drawing Sheets

(56) References Cited

U.S. PATENT DOCUMENTS

2021/0064997 A1\* 3/2021 Lee ......................... G06N 3/08

FOREIGN PATENT DOCUMENTS

| CN | 110764886 | A | 2/2020 |
| CN | 111461290 | A | 7/2020 |
| CN | 111625325 | A | 9/2020 |
| CN | 112445602 | A | 3/2021 |
| CN | 109885389 | B | 7/2021 |

\* cited by examiner

DEEP LEARNING FRAMEWORK SCHEDULING

CROSS REFERENCE TO RELATED APPLICATION

This application claims priority to Chinese Patent Application No. 202110362239.3, filed on Apr. 2, 2021, the contents of which are hereby incorporated by reference in their entirety for all purposes.

TECHNICAL FIELD

The present disclosure relates to computer technologies and, more specifically, relates to a scheduling method for a deep learning framework, a scheduling apparatus, an electronic device, a computer-readable storage medium, and a computer program product that can be used in the field of artificial intelligence, especially in the fields of machine learning, deep learning, etc.

BACKGROUND

A deep learning framework can greatly improve research and development efficiency of a deep learning task, and the deep learning task is usually developed by using the deep learning framework. Most of the current mainstream deep learning frameworks support the use of a central processing unit (CPU), a dedicated processing unit such as a graphics processing unit (GPU), or an application-specific integrated circuit (ASIC) chip, to implement training in deep learning tasks.

At present, there are many scenarios in which several people or tasks multiplex a dedicated processing unit or a central processing unit and an application-specific integrated circuit. Therefore, in the traditional technology, a processing unit is multiplexed by using, for example, a scheduling function of an operating system or a virtualization technology. However, the scheduling function of the operating system is not applicable to a deep learning task including a multi-batch parallel data processing task, and the virtualization technology has high costs with many limitations. As a result, according to a traditional technology for multiplexing of a processing unit, a computing resource and a storage resource of a processing unit including a dedicated processing unit cannot be dynamically scheduled for, for example, a deep learning task. Therefore, the processing unit including the dedicated processing unit cannot perform multi-task computing and multiplexing of the computing and storage resources, and user experience is compromised.

SUMMARY

Embodiments of the present disclosure provide a scheduling method, a scheduling apparatus, an electronic device, a computer-readable storage medium, and a computer program product.

In a first aspect of the present disclosure, a scheduling method is provided, the method including: receiving a processing request for processing a plurality of tasks by using a processing unit, the processing request including scheduling requirements for the plurality of tasks, and each of the plurality of tasks being associated with execution of multi-batch data processing; and scheduling, based on the scheduling requirements for the plurality of tasks in batches of data, the processing unit to process the plurality of tasks.

In a second aspect of the present disclosure, a scheduling apparatus is provided, the apparatus including: a processing request receiving module configured to receive a processing request for processing a plurality of tasks by using a processing unit, the processing request including scheduling requirements for the plurality of tasks, and each of the plurality of tasks being associated with execution of multi-batch data processing; and a first scheduling module configured to schedule, based on the scheduling requirements for the plurality of tasks in batches of data, the processing unit to process the plurality of tasks.

In a third aspect of the present disclosure, an electronic device is provided, the electronic device including one or more processors; a memory storing one or more programs configured to be executed by the one or more processors, the one or more programs including instructions for: receiving a processing request for processing a plurality of tasks by using a processing unit, the processing request comprising scheduling requirements for the plurality of tasks, and each of the plurality of tasks being associated with execution of multi-batch data processing; and scheduling, based on the scheduling requirements for the plurality of tasks in batches of data, the processing unit to process the plurality of tasks.

In a fourth aspect of the present disclosure, a non-transitory computer-readable storage medium storing one or more programs, the one or more programs comprising instructions, which when executed by one or more processors of an electronic device, cause the electronic device to: receive a processing request for processing a plurality of tasks by using a processing unit, the processing request comprising scheduling requirements for the plurality of tasks, and each of the plurality of tasks being associated with execution of multi-batch data processing; and schedule, based on the scheduling requirements for the plurality of tasks in batches of data, the processing unit to process the plurality of tasks.

According to a technology of the present disclosure, a scheduling method is provided. The technical solution of the method may be used to dynamically schedule a computing resource and a storage resource of a processing unit including a dedicated processing unit, and the processing unit including the dedicated processing unit can be used to perform multi-task computing and multiplexing of the computing and storage resources, thereby user experience can be improved.

It should be understood that the content described in the summary is not intended to limit critical or significant features of the embodiments of the present disclosure, nor is it intended to limit the scope of the present disclosure. Other features of the present disclosure will be easily comprehensible from the following description.

BRIEF DESCRIPTION OF THE DRAWINGS

The above and other objectives, features, and advantages of the present disclosure will become clearer by describing example embodiments of the present disclosure in more detail with reference to the accompanying drawings, where the same reference numerals generally represent the same parts in the example embodiments of the present disclosure. It should be understood that the accompanying drawings are used for a better understanding of the solution, and do not constitute a limitation on the present disclosure. In the accompanying drawings.

In all the accompanying drawings, the same or corresponding numerals represent the same or corresponding parts.

DETAILED DESCRIPTION OF THE EMBODIMENTS

Preferred embodiments of the present disclosure will be described in more detail below with reference to the accompanying drawings. Although the preferred embodiments of the present disclosure are shown in the accompanying drawings, it should be understood that the present disclosure may be implemented in various forms and should not be limited to the embodiments illustrated herein. Rather, these embodiments are provided so that the present disclosure is more thorough and complete and that the scope of the present disclosure can be fully conveyed to those skilled in the art.

The term "include/comprise" used herein and its variants mean open inclusion, that is, "including but not limited to". Unless otherwise stated, the term "or" means "and/or". The term "based on" means "at least partially based on". The terms "one example embodiment" and "one embodiment" mean "at least one example embodiment". The term "another embodiment" means "at least one further embodiment". The terms "first", "second", etc. may refer to different or the same objects. Other explicit and implicit definitions may also be included below.

As described in the background section, according to a traditional technology for multiplexing of a processing unit, a computing resource and a storage resource of a processing unit including a dedicated processing unit cannot be dynamically scheduled for, for example, a deep learning task. Therefore, the processing unit including the dedicated processing unit cannot perform multi-task computing and multiplexing of the computing and storage resources, and user experience is compromised.

For convenience of description, a single node single GPU card and the deep learning task are taken as an example for describing problems that a user may encounter when dealing with the deep learning task. Moreover, in the following example, the dedicated processing unit is taken as an example for description, but the protection scope of the present disclosure is not limited to being applicable to the dedicated processing unit, and may also be applicable to other processing units including a central processing unit.

In one scenario, a user 1 is, for example, a deep learning developer, and the user 1 shares a computing device having a dedicated processing unit with other colleagues in a company for deep learning development. After other colleagues start a training task that requires the dedicated processing unit, a resource of the dedicated processing unit is occupied, such that the user 1 cannot use the dedicated processing unit to process a task while other colleagues use the computing device. Moreover, the deep learning task usually requires long training time, thereby greatly affecting the deep learning development of the user 1.

In another scenario, a user 2 is, for example, a deep learning developer, and the user 2 owns a computing device with a dedicated processing unit. When the user 2 starts a training task that requires the dedicated processing unit, the user 2 may want to start another task that requires the dedicated processing unit, for development and debugging.

In another scenario, a user 3 is, for example, a student in a school, and tries to learn deep learning. The deep learning task that the user 3 needs to execute usually has short occupancy time due to a studying scenario, but the user 3 may have to start the deep learning task frequently, and in the school, to improve resource utilization, there are usually a plurality of students using a computing device with a dedicated processing unit at the same time.

In any of the scenarios, multiplexing of the resource of the dedicated processing unit is involved. For the multiplexing, a traditional technology usually includes two modes. A first mode includes directly using a task scheduling function of an operating system such as Linux. A second mode includes using a virtualization technology. For the virtualization technology, taking a graphics processing unit as an example, the virtualization technology may slice a computing capability of a graphics processing unit card, divide the computing capability into a plurality of logically virtual graphics processing units, and schedule a computing capability in units of virtual graphics processing units.

However, both of the modes have serious defects.

For the first mode, an existing operating system schedules computing and storage resources in units of processes in a simple scheduling mode, and most of scheduling strategies are implemented for the central processing unit, which are general scheduling strategies without being specially optimized for the deep learning task. Therefore, the first mode has, for example, the following specific defects: Proportions of resources used by different processes cannot be accurately controlled, for example, setting of how much graphics memory of the graphics processing unit a process is allowed to occupy and how much computing time of the graphics processing unit a process is allowed to occupy cannot be accurately controlled. There is a lack of synchronization between processes, and the deep learning task is usually a compute-intensive task, so it is easy for the processes to compete for resources with each other. For example, if two tasks are submitted to a graphics processing unit card, assuming that there are enough graphics memory resources, compute-intensive tasks may be submitted at the same time during computation. Since the graphics processing unit starts computation tasks in a multi-stream mode, when computation tasks are submitted from two tasks to the device at the same time, performance may be degraded due to a conflict of computing resources, which is reflected in the fact that time for submitting two tasks at the same time and executing the two tasks is longer than that for executing the two tasks separately. The process scheduling is too frequent, which leads to excessive overheads. This is because a scheduling strategy of the operating system is usually executed based on the central processing unit. Therefore, to ensure real-time performance of the processes, inter-process scheduling is very frequent, for example, a process is switched every 50 ms, but the deep learning task usually requires several seconds to train one batch of data, such that frequent process switching may cause problems such as caching invalidation, and the resource utilization is reduced.

The same scheme is used for each process during process scheduling of the operating system, and a specific task type of the process is not known. Therefore, a behavior of the process cannot be dynamically adjusted when a resource is not satisfied.

For the second mode, the virtualization technology has high costs, and requires strong hardware support, and thus is seriously insufficient in universality. Therefore, the second mode has, for example, the following specific defects: virtualization relies on a complex function that is not native to the operating system, and therefore, the virtualization usually requires installation of additional software. Different operating systems and different hardware support the virtualization in different modes, and much hardware does not support the virtualization technology. A resource cannot be accurately controlled, but usually can merely be divided into a specific number of parts, such as eight parts. Scheduling cannot be accurately controlled, for example, exactly 75% of the computing capability cannot be implemented. After the virtualization, due to isolation of a graphics card, a computing resource cannot be fully used. For example, when the computing capability of the graphics processing unit is divided into eight parts, even if there is only one task currently, only one part of resource may be used, resulting in a waste of the computing resource. After the virtualization of the resource, dynamic adjustment can no longer be made. For example, after the computing capability of the graphics processing unit is divided into eight parts, the eight parts cannot be further divided into 16 parts. The virtualization of the resource is completed by an external tool. Therefore, communication with a current training process cannot be implemented, and an attribute of the current training process cannot be dynamically adjusted. Many dedicated processing circuit chips do not support the virtualization at present.

In order to at least partially solve the problems and one or more of other potential problems, the embodiments of the present disclosure provide a scheduling method. The technical solution according to the implementations of the present disclosure may be used to dynamically schedule a computing resource and a storage resource of a processing unit including a dedicated processing unit, and the processing unit including the dedicated processing unit can be used to perform multi-task computing and multiplexing of the computing and storage resources, and user experience can be improved.

Figure 1:
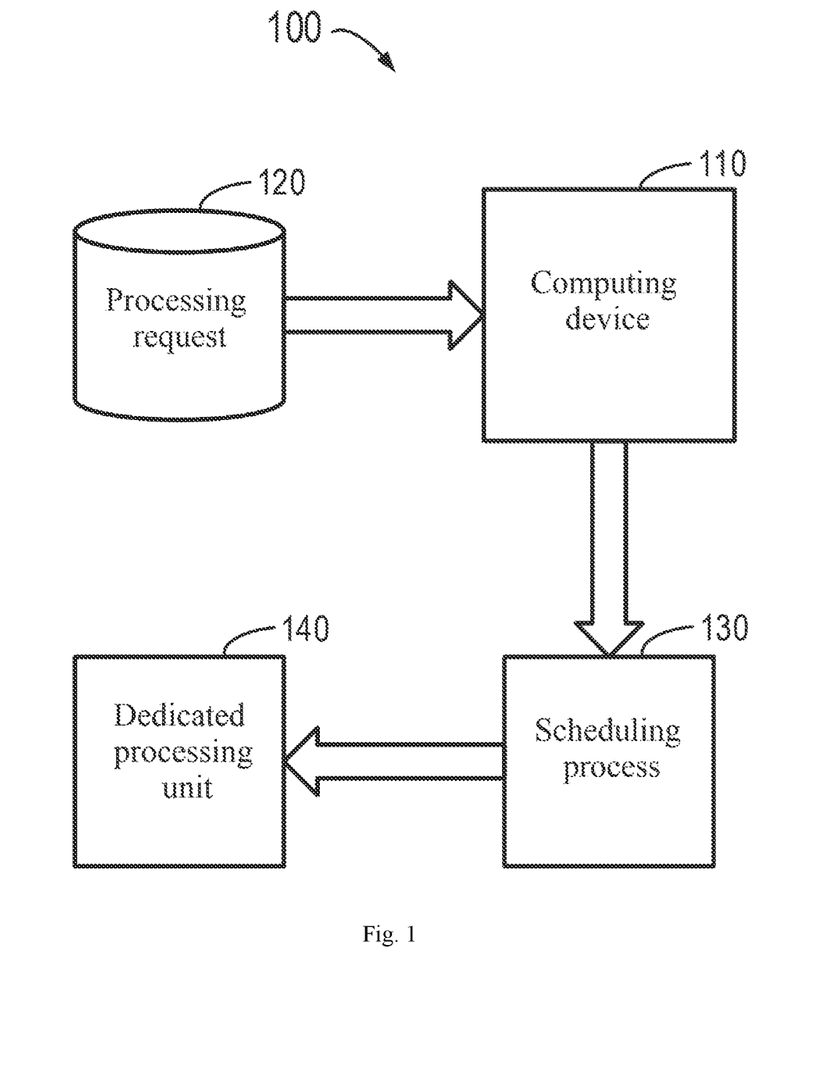
FIG. 1 is a schematic block diagram of a scheduling environment 100 where a scheduling method according to some embodiments of the present disclosure may be implemented.

FIG. 1 is a schematic block diagram of a scheduling environment 100 where a scheduling method according to some embodiments of the present disclosure may be implemented. According to one or more embodiments of the present disclosure, the scheduling environment 100 may be a cloud environment. As shown in FIG. 1, the scheduling environment 100 includes a computing device 110. In the scheduling environment 100, the computing device 110 receives a processing request 120, the processing request 120 includes a processing request for processing a plurality of tasks by using a dedicated processing unit 140 such as a graphics processing unit, and specifically, the processing request may include scheduling requirements for the plurality of tasks. Moreover, each of the plurality of tasks is associated with execution of multi-batch data processing, for example, the task may be associated with training of a deep learning model. Therefore, the scheduling environment 100 may be applicable to a deep learning framework.

After receiving the processing request 120, the computing device 110 schedules, based on the scheduling requirements for the plurality of tasks in batches of data by using a scheduling process 130 in the scheduling environment 100, the dedicated processing unit 140 in the scheduling environment 100 to process the plurality of tasks. According to one or more embodiments of the present disclosure, the processing request 120 is generated for the plurality of processing tasks, and the scheduling requirements may include at least one of: processing time of the dedicated processing unit 140 occupied for processing a task in the plurality of tasks; storage space of a memory of the dedicated processing unit 140 occupied for processing a task in the plurality of tasks; and a processing priority of a task in the plurality of tasks.

It should be understood that the scheduling environment 100 is merely an example but not restrictive, and moreover, the scheduling environment is extensible, where more computing devices 110 may be included, the computing device 110 may receive more processing requests 120, and more scheduling processes 130 may be used for scheduling more dedicated processing units 140 in the scheduling environment 100 to process more tasks, such that more users may simultaneously use more computing devices 110 and more dedicated processing units 140 to simultaneously or non-simultaneously process more tasks associated with the execution of the multi-batch data processing.

In the scheduling environment 100 shown in FIG. 1, the computing device 110 receives the processing request 120, and the computing device may use the scheduling process 130 and the scheduling process 130 may schedule the dedicated processing unit 140 over a network.

Figure 2:
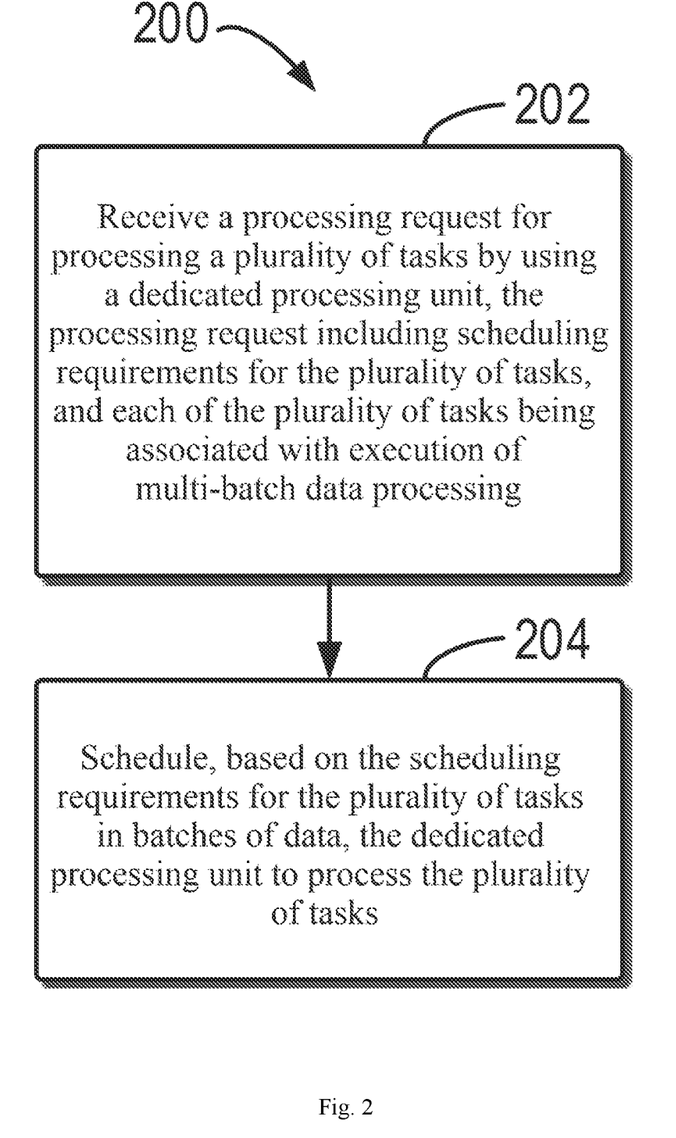
FIG. 2 is a flowchart of a scheduling method 200 according to an embodiment of the present disclosure.

FIG. 2 is a flowchart of a scheduling method 200 according to an embodiment of the present disclosure. Specifically, the scheduling method 200 may be performed by the computing device 110 in the scheduling environment 100 shown in FIG. 1. It should be understood that the scheduling method 200 may further include additional operations not shown and/or may omit shown operations, and the scope of the present disclosure is not limited in the aspect.

In block 202, the computing device 110 receives a processing request for processing a plurality of tasks by using a dedicated processing unit 140. According to one or more embodiments of the present disclosure, the processing request includes scheduling requirements for the plurality of tasks, and each of the plurality of tasks is associated with execution of multi-batch data processing.

According to one or more embodiments of the present disclosure, the scheduling requirements may include at least one of: processing time of the dedicated processing unit 140 occupied for processing a task in the plurality of tasks; storage space of a memory of the dedicated processing unit 140 occupied for processing a task in the plurality of tasks; and a processing priority of a task in the plurality of tasks. In addition, the task associated with the execution of the multi-batch data processing is associated with, for example, training of a deep learning model, and therefore, the scheduling method 200 may be applicable to a deep learning framework.

Starting of a working process is taken as an example, and the working process may be started by inputting a command in a control console by a user. For example, a working process 1 (a process pid number is, for example, 4561) may be started by inputting a command python -m control -launch -memory=30% -gpu=40% -priority=0 train1.py, and a working process 2 (pid=4562) and a working process 3 (pid=4563) may be started similarly. The control herein is used for implementing process scheduling logic by calling a control module. -memory=30% means that a desired memory size for using of a graphics memory of a graphics processing unit is greater than or equal to 30%. -gpu=40% means that a desired computing duration ratio for using of the graphics processing unit is greater than or equal to 40%. -priority=0 means a priority of a current process, which is numbered from 0 and for which a smaller value indicates a higher priority. When a system resource cannot satisfy resources requested by all processes, a priority is given to resource occupancy of a higher-priority process.

In the foregoing example, graphics memory occupancy may be set in a percentage or an absolute value, for example, -memory=2G means using a 2 GB graphics memory. According to different scheduling strategies, a range may be set for the graphics memory and the computing capability, for example, -memory="2G, 10G" means that minimum graphics memory occupancy is 2 GB and maximum graphics memory occupancy is not greater than 10 GB. If the system resource cannot satisfy a specific requirement, error reporting and exiting may be performed. By setting a minimum value, failure after the graphics memory is occupied due to start of other processes may be avoided. When the system resource cannot satisfy the requirement, a priority may be given to ensure that a historical task may run normally, and in this case, a newly started task may fail.

In block 204, the computing device 110 schedules, based on the scheduling requirements for the plurality of tasks in batches of data, the dedicated processing unit 140 to process the plurality of tasks. According to one or more embodiments of the present disclosure, the computing device 110 schedules, based on the scheduling requirements for the plurality of tasks in batches of data by using a scheduling process 130, the dedicated processing unit 140 to process the plurality of tasks. The computing device 110 may further determine, each time one batch of data in the multi-batch data processing involved in a task is performed, whether to continue processing a subsequent batch of data of a task or a next batch of data needs to be processed in other tasks based on the scheduling requirements.

As described above, the scheduling requirements may include at least one of: the processing time of the dedicated processing unit 140 occupied for processing a task in the plurality of tasks; the storage space of a memory of the dedicated processing unit 140 occupied for processing a task in the plurality of tasks; and the processing priority of a task in the plurality of tasks. The scheduling of the dedicated processing unit 140 by using the scheduling process 130 by the computing device 110 is described below by taking the scheduling requirements include the processing time or the storage space as an example, respectively.

According to some embodiments of the present disclosure, the scheduling requirements include the processing time of the dedicated processing unit 140 occupied for processing a task in the plurality of tasks. In these embodiments, the computing device 110 determines processing time to be consumed of a task in the plurality of tasks, based on processing time, indicated in the scheduling requirements, of the dedicated processing unit 140 occupied for processing the task in the plurality of tasks, and consumed processing time of the task in the plurality of tasks; and then schedules, by using the scheduling process 130, the dedicated processing unit 140 to process a task with maximum processing time to be consumed in the plurality of tasks.

For example, if the plurality of tasks include two tasks: a first task and a second task, and it is indicated in the scheduling requirements that processing of the first task and processing of the second task each occupy 50% of the processing time of the dedicated processing unit 140. In this case, to start to process the first task and the second task, the scheduling process 130 may randomly choose to start to process, for example, the first task. When processing of a first batch of data of the first task occupies 5% of the processing time of the dedicated processing unit 140, consumed processing time of the first task is 5%, and processing time to be consumed of the first task is 45%. Then, the scheduling process 130 may schedule the dedicated processing unit 140 to process the second task, because processing time to be consumed of the second task is still 50% and the second task is a task with maximum processing time to be consumed in the plurality of tasks. It should be understood that the processing time may be in a form other than a percentage, such as in a form of actual processing time in seconds, minutes, hours, etc.

According to some other embodiments of the present disclosure, the scheduling requirements include the storage space of a memory of the dedicated processing unit 140 occupied for processing a task in the plurality of tasks. In these embodiments, the computing device 110 may process a task in different processing modes.

In some embodiments, when it is determined that storage space of a memory of the dedicated processing unit 140 occupied for processing a task, such as the first task, in the plurality of tasks exceeds the storage space indicated in the scheduling requirements and allocated to the first task, the computing device 110 stops processing the first task. The purpose of this approach is to directly ensure normal processing of other tasks by the dedicated processing unit 140. Therefore, when storage space used by a task exceeds allocated storage space indicated in the scheduling requirements, and consequently, other tasks cannot be normally processed, processing of the task may be stopped directly.

In some other embodiments, when it is determined that storage space of a memory of the dedicated processing unit 140 occupied for processing a task, such as the first task, in the plurality of tasks exceeds the storage space indicated in the scheduling requirements and allocated to the first task, the computing device 110 adjusts processing of the first task to reduce the storage space occupied for processing the first task. The purpose of this approach is to ensure that the first task can still be processed as much as possible while ensuring the normal processing of other tasks by the dedicated processing unit 140, and therefore reduce the storage space occupied for processing the first task by adjusting a processing mode of the first task.

According to one or more embodiments of the present disclosure, adjustment of processing of the first task by the computing device 110 includes at least one of: reducing a size of each batch of data in the multi-batch data processing associated with the first task, for example, reducing the size of each batch of data by a half; reducing data that needs to be stored during processing of the first task by recalculating when the data needs to be used; and storing, by using another memory, the data that needs to be stored during processing of the first task. For instance, by means of a graphics memory interaction technology, data stored in the graphics memory is moved to a memory or solid state drive associated with a central processing unit of the computing device 110 for example, and thereby graphics memory space occupied by the data is reduced, and the data stored in the memory or solid state drive is moved back to the graphics memory when being needed by a subsequent processing task.

It should be understood that the scheduling requirements may alternatively include both the processing time of the dedicated processing unit 140 occupied for processing a task in the plurality of tasks and the storage space of a memory of the dedicated processing unit 140 occupied for processing a task in the plurality of tasks. In this case, the computing device 110 may schedule, based on the processing time of the dedicated processing unit 140 occupied for processing a task in the plurality of tasks, the dedicated processing unit 140 by using the scheduling process 130 when the storage space is normal, and may stop, when the storage space is anomalous, processing the task related to the anomalous storage space or adjust processing of the task related to the anomalous storage space.

According to one or more embodiments of the present disclosure, when the scheduling requirements include the processing priority of a task in the plurality of tasks, the computing device 110 may determine a sequence of processing tasks based on processing priorities, and may give a priority to processing of tasks with higher processing priorities. In addition, when the scheduling requirements include the processing priority, the computing device 110 may further reduce the processing priority as the task is processed. For example, when a processing priority of the first task is 100 and a processing priority of the second task is 70, a higher processing priority value indicating a higher processing priority, the computing device 110 first schedule, by using the scheduling process 130, the dedicated processing unit 140 to process the first task. If 20 batches of data need to be processed in total during processing of the first task, then the processing of each batch of data may reduce processing time of the dedicated processing unit 140 occupied for processing the first task by 5%. In this case, a value of the processing priority may be reduced proportionally at the same time. After the dedicated processing unit 140 processes seven batches of data of the first task, the processing time of the dedicated processing unit 140 occupied for processing the first task may be reduced by 35%, and the processing priority of the first task is also reduced by 35% to become 65. In this case, since the processing priority 65 of the first task is less than a processing priority 70 of the second task, the computing device 110 may then schedule, by using the scheduling process 130, the dedicated processing unit 140 to process the second task.

It should be noted that when the priorities of the two tasks are the same, the computing device 110 may randomly select which task the dedicated processing unit 140 is scheduled to process, or determine, based on processing time to be consumed, consumed processing time, a standard of not changing a task being processed, etc., which task the dedicated processing unit 140 is scheduled to process.

Figure 3:
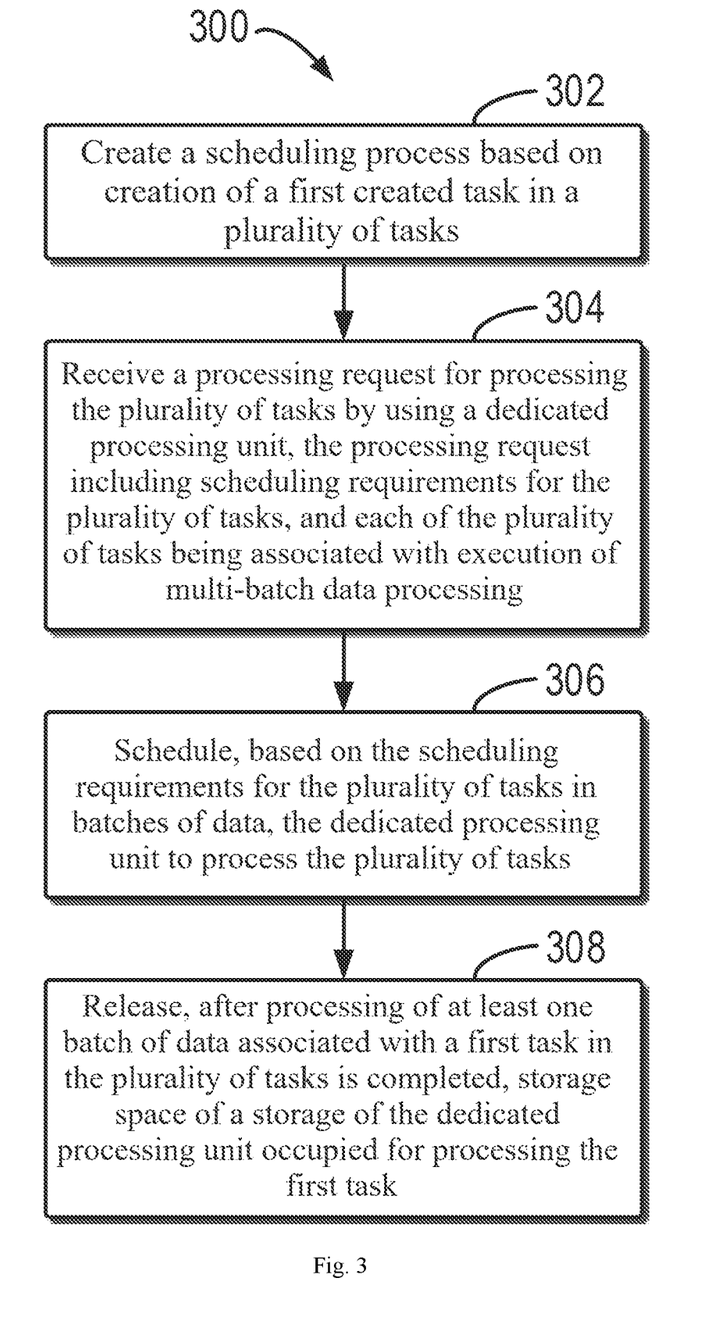
FIG. 3 is a flowchart of a scheduling method 300 according to an embodiment of the present disclosure.

FIG. 3 is a flowchart of a scheduling method 300 according to an embodiment of the present disclosure. Specifically, the scheduling method 300 may also be executed by the computing device 110 in the scheduling environment 100 shown in FIG. 1. It should be understood that the scheduling method 300 may further include additional operations not shown and/or may omit shown operations, and the scope of the present disclosure is not limited in the aspect.

In block 302, the computing device 110 creates a scheduling process 130 based on creation of a first created task in a plurality of tasks. According to one or more embodiments of the present disclosure, in the example described above, when a user starts a working process 1 by inputting a command python -mcontrol -launch -memory=30% -gpu=40% -priority=0 train1.py, the computing device 110 may check whether the scheduling process 130 has been created, and if the scheduling process 130 has not been created, the scheduling process 130 is created while or after the working process 1 is created. In addition, according to one or more embodiments of the present disclosure, a created task such as a working process may include a scheduling function such as scheduling logic, and the computing device 110 may create the scheduling process 130 by using a scheduling function included in the first created task.

According to some embodiments of the present disclosure, the scheduling process 130 may alternatively be created in advance, and may be created by the computing device 110 before any of the plurality of tasks is created. Therefore, operations involved in block 302 may be considered as optional operations in the method 300.

According to one or more embodiments of the present disclosure, after the computing device 110 creates the scheduling process 130 based on the creation of the first created task in the plurality of tasks, the computing device 110 creates, based on completion of the first created task, the scheduling process 130 by using a scheduling function included in an uncompleted task in the plurality of tasks. For example, in the above example, after execution of the working process 1 is completed, the working process 1 may no longer exist, and therefore a scheduling function included in the working process 1 may no longer exist. In this case, in order to continue to schedule the dedicated processing unit 140 by using the scheduling process 130, the computing device 110 may create the scheduling process 130 by using a working process whose execution is not completed, for example, a working process 2, in the working process 2 and a working process 3 that share the dedicated processing unit 140 with the working process 1.

In block 304, the computing device 110 receives a processing request for processing the plurality of tasks by using the dedicated processing unit 140. According to one or more embodiments of the present disclosure, as described above, the processing request includes scheduling requirements for the plurality of tasks, and each of the plurality of tasks is associated with execution of multi-batch data processing. The specific content of the step involved in block 304 is the same as that involved in block 202, and is not described in detail herein again.

In block 306, the computing device 110 schedules, based on the scheduling requirements for the plurality of tasks in batches of data by using the scheduling process 130, the dedicated processing unit 140 to process the plurality of tasks. According to one or more embodiments of the present disclosure, as described above, the computing device 110 may further determine, each time one batch of data in the multi-batch data processing involved in a task is performed, whether to continue processing a subsequent batch of data of a task or a next batch of data needs to be processed in other tasks based on the scheduling requirements. The specific content of the step involved in block 306 is the same as that involved in block 204, and is not described in detail herein again.

In block 308, the computing device 110 releases, after processing of at least one batch of data associated with a task, such as the first task, in the plurality of tasks is completed, storage space of a storage of the dedicated processing unit 140 occupied for processing the first task. According to some embodiments of the present disclosure, the computing device 110 may release, after scheduling the dedicated processing unit 140 to process each batch of data of each task by using the scheduling process 130, storage space of a memory of the dedicated processing unit 140 occupied for processing the task, thereby greatly reducing storage space occupancy. According to some other embodiments of the present disclosure, the computing device 110 may release, after scheduling the dedicated processing unit 140 to process each batch of data of each task by using the scheduling process 130 and when it is determined that the dedicated processing unit 140 is scheduled to process another task then, storage space of a memory of the dedicated processing unit 140 occupied for processing the task. According to still some other embodiments of the present disclosure, the computing device 110 may release, after scheduling the dedicated processing unit 140 to process each batch of data of each task by using the scheduling process 130 and when it is determined that the storage space occupied by the task is greater than a preset storage space threshold, storage space of a memory of the dedicated processing unit 140 occupied for processing the task.

It should be understood that operations involved in block 308 are optional operations in the method 300, and aim to greatly reduce the storage space occupancy. Therefore, when the storage space is sufficient or it is necessary to avoid time spent in reallocating storage space for a task, the operations involved in block 308 may not be needed.

Based on the method 200 and the method 300 described above, one or more embodiments according to the present disclosure may further include the following specific example embodiments.

Embodiment 1

Step 1, a working process 1 is started;
Step 2, whether there is a scheduling process 130 at present is checked, and if there is no scheduling process, the scheduling process 130 is created;
Step 3, the working process 1 communicates with the scheduling process 130 to notify required processing time, required storage space, and a required processing priority;
Step 4, processing of a first batch of data of the working process 1 is started, and the actually occupied storage space is recorded, if the actually occupied storage space exceeds a preset size, the working process 1 communicates with the scheduling process 130 to apply for more graphics memory resources, and if the application fails, error reporting and exiting are performed;
Step 5, the processing of the first batch of data is finished, and the working process 1 communicates with the scheduling process 130 to notify that the processing of the batch of data is completed, release a computing resource, and enter a state of waiting for scheduling;
Step 6, the scheduling process 130 performs scheduling based on execution time of all processes, and sends a signal to the working process 1 when the working process 1 allows to be executed; and
Step 7, the working process 1 continues to process a next batch of data, and step 4 is repeated.

Embodiment 2

Step 1, a working process 1 is started;
Step 2, whether there is a scheduling process 130 at present is checked, and if there is no scheduling process, the scheduling process 130 is created;
Step 3, the working process 1 communicates with the scheduling process 130 to notify required processing time, required storage space, and a required processing priority;
Step 4, processing of a first batch of data of the working process 1 is started, and the actually occupied storage space is recorded, and if the actually occupied storage space exceeds a preset size, the working process 1 communicates with the scheduling process 130 to apply for more graphics memory resources;
Step 5, if the application fails, a processing mode is dynamically adjusted, and a mode that saves more storage space is used for processing;
Step 6, the processing of the first batch of data is finished, and the working process 1 communicates with the scheduling process 130 to notify that the processing of the batch of data is completed, release a computing resource, and enter a state of waiting for scheduling;
Step 7, the scheduling process 130 performs scheduling based on execution time of all processes, and sends a signal to the working process 1 when the working process 1 allows to be executed; and
Step 8, the working process 1 continues to process a next batch of data, and step 4 is repeated.

Embodiment 3

Step 1, a working process 1 is started;
Step 2, whether there is a scheduling process 130 at present is checked, and if there is no scheduling process, the scheduling process 130 is created;
Step 3, the working process 1 communicates with the scheduling process 130 to notify required processing time, required storage space, and a required processing priority;
Step 4, processing of a first batch of data of the working process 1 is started, and the actually occupied storage space is recorded, and if the actually occupied storage space exceeds a preset size, the working process 1 communicates with the scheduling process 130 to apply for more graphics memory resources;
Step 5, if the application fails, a processing mode is dynamically adjusted, and a mode that saves more storage space is used for processing;
Step 6, the processing of the first batch of data is finished, and the working process 1 communicates with the scheduling process 130 to notify that the processing of the batch of data is completed, release a computing resource, release the occupied storage space, and enter a state of waiting for scheduling;
Step 7, the scheduling process 130 performs scheduling based on execution time of all processes, and sends a signal to the working process 1 when the working process 1 allows to be executed; and
Step 8, the working process 1 continues to process a next batch of data, and step 4 is repeated.

The content related to the scheduling environment 100 where the scheduling method in some embodiments of the present disclosure may be implemented, the scheduling method 200 according to the embodiment of the present disclosure, and the scheduling method 300 according to the embodiment of the present disclosure are described above with reference to FIGS. 1 to 3. It should be understood that the above description is for better showing the content recorded in the present disclosure, but not for limiting the present disclosure in any way.

It should be understood that the numbers and physical quantities of various elements used in the above accompanying drawings of the present disclosure are merely examples, and do not limit the protection scope of the present disclosure. The numbers and sizes may be arbitrarily set according to needs, without affecting normal implementation of the embodiments of the present disclosure.

Details of the scheduling method 200 and the scheduling method 300 according to the embodiments of the present disclosure are described above with reference to FIGS. 1 to 3. Hereinafter, each module in a scheduling apparatus is described with reference to FIG. 4.

Figure 4:
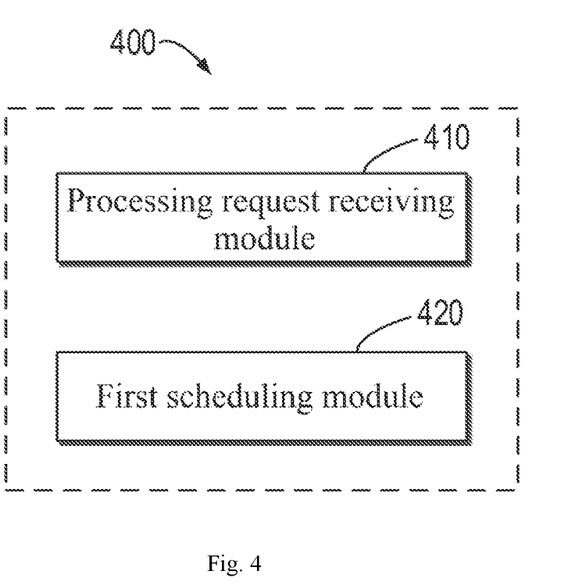
FIG. 4 is a schematic block diagram of a scheduling apparatus 400 according to an embodiment of the present disclosure.

FIG. 4 is a schematic block diagram of a scheduling apparatus 400 according to an embodiment of the present disclosure. As shown in FIG. 4, the scheduling apparatus 400 includes: a processing request receiving module 410 configured to receive a processing request for processing a plurality of tasks by using a processing unit, the processing request including scheduling requirements for the plurality of tasks, and each of the plurality of tasks being associated with execution of multi-batch data processing; and a first scheduling module 420 configured to schedule, based on the scheduling requirements for the plurality of tasks in batches of data, the processing unit to process the plurality of tasks.

In one or more embodiments, the processing unit includes a dedicated processing unit.

In one or more embodiments, the scheduling requirements include at least one of: processing time of the processing unit occupied for processing a task in the plurality of tasks; storage space of a memory of the processing unit occupied for processing a task in the plurality of tasks; and a processing priority of a task in the plurality of tasks.

In one or more embodiments, the plurality of tasks are associated with training of a deep learning model, and therefore, the scheduling apparatus 400 may be applicable to a deep learning framework.

In one or more embodiments, the first scheduling module 420 includes: a second scheduling module (not shown) configured to schedule, based on the scheduling requirements for the plurality of tasks in batches of data by using a scheduling process, the processing unit to process the plurality of tasks.

In one or more embodiments, the scheduling apparatus 400 further includes: a first scheduling process creation module (not shown) configured to create the scheduling process based on creation of a first created task in the plurality of tasks.

In one or more embodiments, the first scheduling process creation module includes: a second scheduling process creation module (not shown) configured to create the scheduling process by using a scheduling function included in the first created task.

In one or more embodiments, the scheduling apparatus 400 further includes: a third scheduling process creation module (not shown) configured to create, based on completion of the first created task, the scheduling process by using a scheduling function included in an uncompleted task in the plurality of tasks.

In one or more embodiments, the second scheduling module includes: a module for determining processing time to be consumed (not shown) configured to determine processing time to be consumed of a task in the plurality of tasks, based on processing time, indicated in the scheduling requirements, of the processing unit occupied for processing the task in the plurality of tasks, and consumed processing time of the task in the plurality of tasks; and a third scheduling module (not shown) configured to schedule, by using the scheduling process, the processing unit to process a task with maximum processing time to be consumed in the plurality of tasks.

In one or more embodiments, the first scheduling module 420 includes: a processing stopping module (not shown) configured to stop processing a first task based on determining that storage space of a memory of the processing unit occupied for processing the first task in the plurality of tasks exceeds storage space indicated in the scheduling requirements and allocated to the first task.

In one or more embodiments, the first scheduling module 420 includes: a processing adjustment module (not shown) configured to adjust processing of a first task to reduce storage space occupied for processing the first task based on determining that storage space of a memory of the processing unit occupied for processing the first task in the plurality of tasks exceeds storage space indicated in the scheduling requirements and allocated to the first task.

In one or more embodiments, the processing adjustment module includes at least one of: a per-batch data size reducing module configured to reduce a size of each batch of data in the multi-batch data processing associated with the first task; a stored-data reducing module configured to reduce data needs to be stored during processing of the first task by recalculation when the data needs to be used; and a data storage module configured to store, by using another memory, the data needs to be stored during processing of the first task.

In one or more embodiments, the scheduling apparatus 400 further includes: a storage space releasing module configured to release, after processing of at least one batch of data associated with a first task in the plurality of tasks is completed, storage space of a storage of the processing unit occupied for processing the first task.

With reference to description of FIGS. 1 to 4, compared with a traditional solution, a technical solution according to the embodiments of the present disclosure has many advantages. For example, according to the technical solution of the embodiments of the present disclosure, a computing resource and a storage resource of the dedicated processing unit can be dynamically scheduled, thereby the dedicated processing unit can be used to perform multi-task computing and multiplexing of the computing and storage resources, and user experience can be improved. Specifically, according to the technical solution of the embodiments of the present disclosure, computing and storage resources allocated to each task may be accurately controlled. The same type of tasks may be scheduled, such that a simpler scheduling strategy may be implemented with higher scheduling efficiency. The task may be dynamically adjusted under the condition of insufficient computing and storage resources, and thus the requirement of the task on the computing and storage resources is reduced. In addition, the technical solution according to the embodiments of the present disclosure is easy to implement and use, and its implementation and use may be independent of hardware and the operating system, and therefore, the technical solution has good adaptability.

According to an embodiment of the present disclosure, the present disclosure further provides an electronic device, a computer-readable storage medium, and a computer program product.

Figure 5:
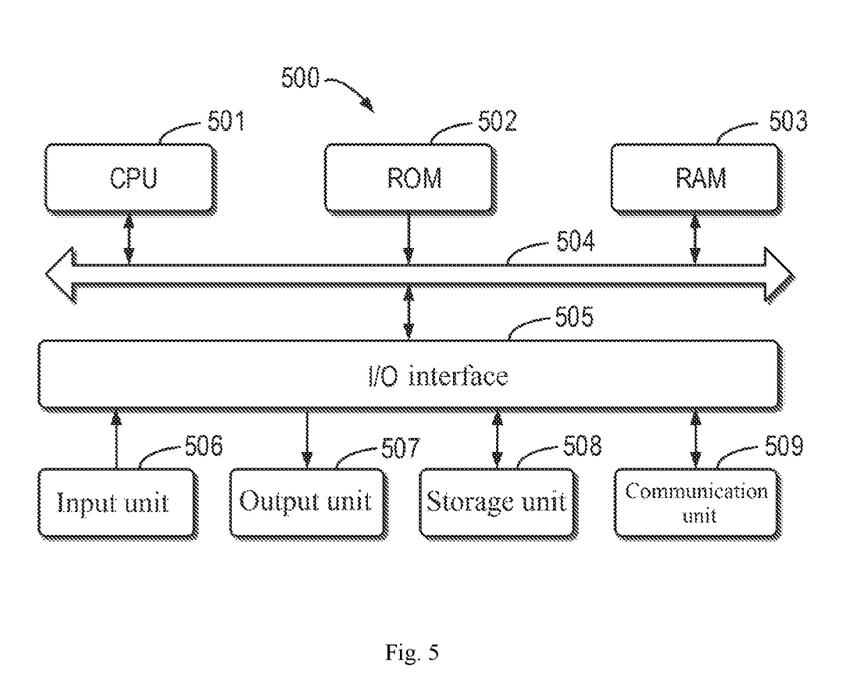
FIG. 5 is a schematic block diagram of an example electronic device 500 that can be used to implement the embodiments of the present disclosure.

FIG. 5 is a schematic block diagram of an example electronic device 500 that can be used to implement the embodiments of the present disclosure. For example, the computing device 110 shown in FIG. 1 and the scheduling apparatus 400 shown in FIG. 4 may be implemented by the electronic device 500. The electronic device 500 is intended to represent various forms of digital computers, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 5, the device 500 includes a computing unit 501, which may perform various appropriate actions and processing according to a computer program stored in a read-only memory (ROM) 502 or a computer program loaded from a storage unit 508 to a random access memory (RAM) 503. The RAM 503 may further store various programs and data required for the operation of the device 500. The computing unit 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, such as a keyboard or a mouse; an output unit 507, such as various types of displays or speakers; a storage unit 508, such as a magnetic disk or an optical disc; and a communication unit 509, such as a network interface card, a modem, or a wireless communication transceiver. The communication unit 509 allows the device 500 to exchange information/data with other devices through a computer network such as the Internet and/or various telecommunications networks.

The computing unit 501 may be various general-purpose and/or special-purpose processing components with processing and computing capabilities. Some examples of the computing unit 501 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 501 performs the various methods and processing described above, for example, the methods 200 and 300. For example, in some embodiments, the methods 200 and 300 may be implemented as a computer software program, which is tangibly contained in a machine readable medium, such as the storage unit 508. In some embodiments, a part or all of the computer program may be loaded and/or installed onto the device 500 via the ROM 502 and/or the communication unit 509. When the computer program is loaded to the RAM 503 and executed by the computing unit 501, one or more steps of the methods 200 and 300 described above can be performed. Alternatively, in other embodiments, the computing unit 501 may be configured, by any other suitable means (for example, by means of firmware), to perform the methods 200 and 300.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: the systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

A program code used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, voice input, or tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps recorded in the present disclosure can be performed in parallel, in order, or in a different order, provided that the desired result of the technical solutions disclosed in the present disclosure can be achieved, which is not limited herein.

The specific implementations above do not constitute a limitation on the protection scope of the present disclosure. Those skilled in the art should understand that various modifications, combinations, sub-combinations, and replacements can be made based on design requirements and other factors. Any modifications, equivalent replacements, improvements, etc. within the spirit and principle of the present disclosure shall fall within the protection scope of the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A computer-implemented scheduling method, comprising:
   creating, based on creation of a first created task in a plurality of tasks, a scheduling process using a scheduling function comprised in the first created task;
   recreating, based on completion of the first created task, the scheduling process by using a scheduling function comprised in an uncompleted task in the plurality of tasks;
   receiving a processing request for processing the plurality of tasks by using a processing unit, the processing request comprising scheduling requirements for the plurality of tasks, and each of the plurality of tasks being associated with execution of multi-batch data processing;
   scheduling, based on the scheduling requirements for the plurality of tasks in batches of data, the processing unit using the recreated scheduling process to process the plurality of tasks; and
   releasing, after processing of at least one batch of data associated with a first task in the plurality of tasks is completed, storage space of a storage of the processing unit occupied for processing the first task.

2. The method according to claim 1, wherein the processing unit comprises a dedicated processing unit.

3. The method according to claim 1, wherein the scheduling requirements comprise at least one of:
   processing time of the processing unit occupied for processing a task in the plurality of tasks;
   storage space of a memory of the processing unit occupied for processing a task in the plurality of tasks; and
   a processing priority of a task in the plurality of tasks.

4. The method according to claim 1, wherein the plurality of tasks are associated with training of a deep learning model.

5. The method according to claim 1, wherein the scheduling the processing unit to process the plurality of tasks comprises:
   determining processing time to be consumed of a task in the plurality of tasks, based on processing time, indicated in the scheduling requirements, of the processing unit occupied for processing the task in the plurality of tasks, and consumed processing time of the task in the plurality of tasks; and
   scheduling, by using the scheduling process, the processing unit to process a task with maximum processing time to be consumed in the plurality of tasks.

6. The method according to claim 1, wherein the scheduling the processing unit to process the plurality of tasks comprises:
   stopping processing a first task based on determining that storage space of a memory of the processing unit occupied for processing the first task in the plurality of tasks exceeds storage space indicated in the scheduling requirements and allocated to the first task.

7. The method according to claim 1, wherein the scheduling the processing unit to process the plurality of tasks comprises:
   adjusting processing of a first task to reduce storage space occupied for processing the first task based on determining that storage space of a memory of the processing unit occupied for processing the first task in the plurality of tasks exceeds storage space indicated in the scheduling requirements and allocated to the first task.

8. The method according to claim 7, wherein the adjusting processing of a first task comprises at least one of:
   reducing a size of each batch of data in the multi-batch data processing associated with the first task;
   reducing data that needs to be stored during processing of the first task by recalculating when the data needs to be used; and
   storing, by using another memory, the data that needs to be stored during processing of the first task.

9. An electronic device, comprising:
   one or more processors;
   a memory storing one or more programs configured to be executed by the one or more processors, the one or more programs comprising instructions for:
   creating, based on creation of a first created task in a plurality of tasks, a scheduling process using a scheduling function comprised in the first created task;
   recreating, based on completion of the first created task, the scheduling process by using a scheduling function comprised in an uncompleted task in the plurality of tasks;
   receiving a processing request for processing the plurality of tasks by using a processing unit, the processing request comprising scheduling requirements for the plurality of tasks, and each of the plurality of tasks being associated with execution of multi-batch data processing;
   scheduling, based on the scheduling requirements for the plurality of tasks in batches of data, the processing unit using the recreated scheduling process to process the plurality of tasks; and releasing, after processing of at least one batch of data associated with a first task in the plurality of tasks is completed, storage space of a storage of the processing unit occupied for processing the first task.

10. A non-transitory computer-readable storage medium storing one or more programs, the one or more programs comprising instructions, which when executed by one or more processors of an electronic device, cause the electronic device to:
create, based on creation of a first created task in a plurality of tasks, a scheduling process using a scheduling function comprised in the first created task;
recreate, based on completion of the first created task, the scheduling process by using a scheduling function comprised in an uncompleted task in the plurality of tasks;
receive a processing request for processing the plurality of tasks by using a processing unit, the processing request comprising scheduling requirements for the plurality of tasks, and each of the plurality of tasks being associated with execution of multi-batch data processing;
schedule, based on the scheduling requirements for the plurality of tasks in batches of data, the processing unit using the recreated scheduling process to process the plurality of tasks; and
release, after processing of at least one batch of data associated with a first task in the plurality of tasks is completed, storage space of a storage of the processing unit occupied for processing the first task.

* * * * *